June 29, 1937.  J. J. MILLER  2,085,113
LAWN MOWER ATTACHMENT
Filed Sept. 1, 1936  2 Sheets—Sheet 2
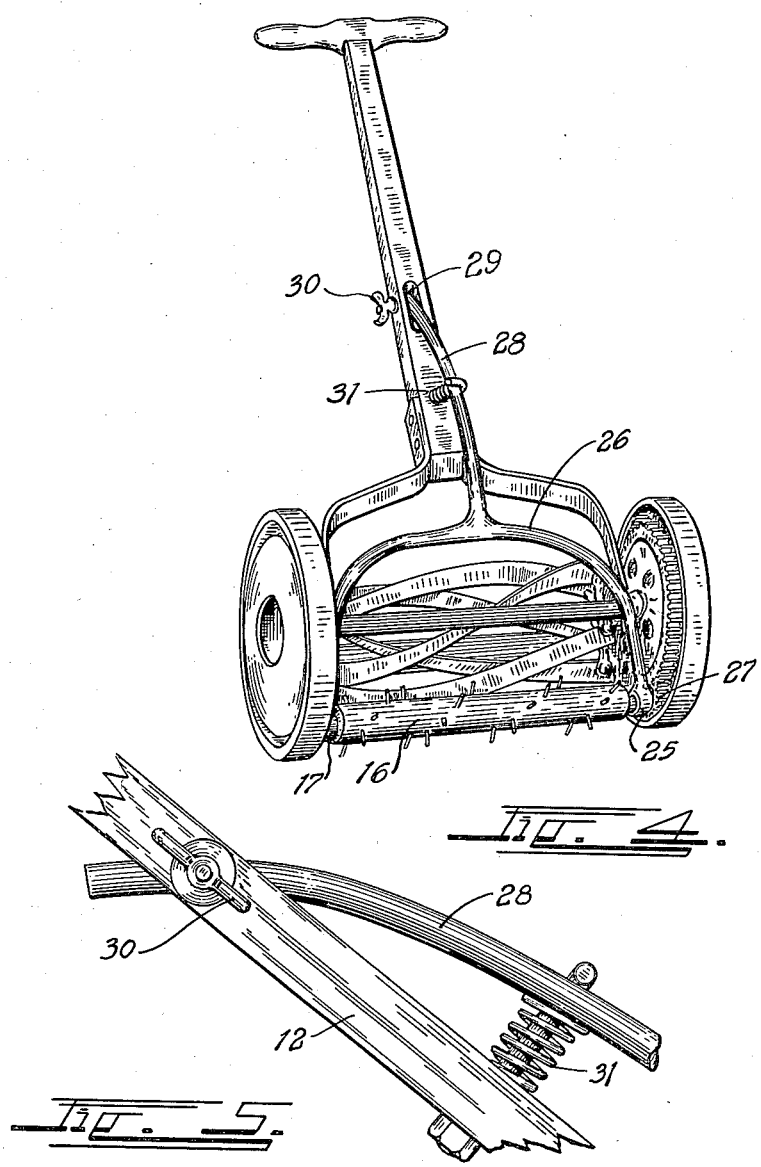
INVENTOR.
Jerome J. Miller
BY
ATTORNEY.

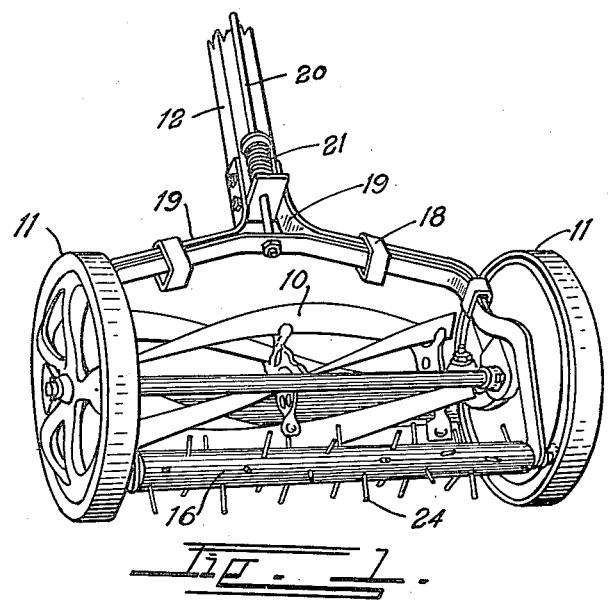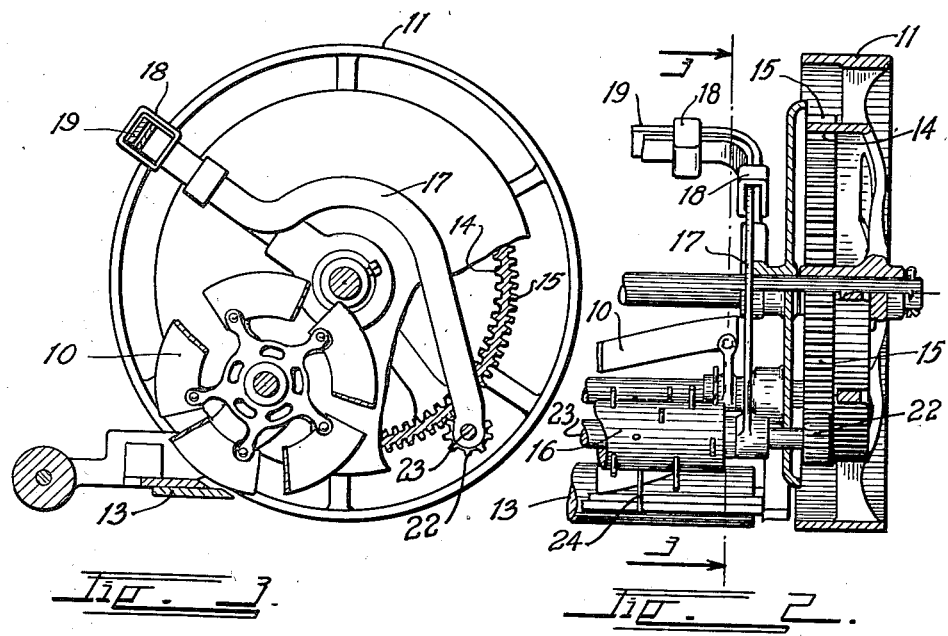

Patented June 29, 1937

2,085,113

UNITED STATES PATENT OFFICE 2,085,113

LAWN MOWER ATTACHMENT

Jerome J. Miller, Chadron, Nebr.

Application September 1, 1936, Serial No. 98,843

8 Claims. (Cl. 56—294)

This invention relates to an improvement in lawn mowers. Occasionally, the grass in a lawn will become tramped or beaten down by rain, etc., so that it is extremely difficult to do an efficient job of lawn cutting. The principal object of this invention is to provide a lawn mower which will rake or lift the fallen grass in advance of the cutting blade, so that all of the grass will be in position to be properly cut.

Another object of the invention is to provide a rotary rake for raking and cultivating the grass in advance of the cutting operation.

Other objects are to provide a cultivating roller attachment for lawn mowers which can be thrown into and out of operation by the operator whenever desired; and to provide a rotary rake which will rotate in a direction opposite to the direction of the cutting blades so as to position the grass blades in an upstanding position.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:—

Fig. 1 is a perspective view of a lawn mower with the invention in place thereon.

Fig. 2 is an enlarged detail view illustrating the driving mechanism in the left hand wheel. In this view, the wheel is shown in section to illustrate the interior mechanism.

Fig. 3 is a cross section through the lawn mower, taken on the line 3—3, Fig. 2.

Fig. 4 is a perspective view illustrating an alternate form of the invention.

Fig. 5 is an enlarged side view of the handle connections in the alternate form.

The various parts of a typical lawn mower are indicated by numeral as follows: rotary blades 10; drive wheels 11; handle 12, handle fork 19, stationary blade 13. In the usual lawn mower, the rotary blades 10 are driven from small pinions which engage internal gear teeth 14 in the drive wheels 11. In applying the invention, a second external gear 15 is installed in each of the drive wheels 11 for operating a rotary rake member 16.

The rotary rake member is carried on a rake shaft 23, which is supported in a suitable yoke 17 mounted in slides 18 on the fork 19 of the handle 12. The shaft 23 terminates in small pinions 22 which mesh with the external gear 15. The yoke 17 supports the rake immediately ahead of the rotary blades 10, and immediately above the ground and it is in turn connected to an operating rod 20, which extends upwardly along the handle 12 to a convenient position for the operator. A compression spring 21 constantly urges the rod 20 upwardly so as to cause the yoke 17 to hold the rake pinions 22 against the teeth of the gear 15.

It can be readily seen that the operator can, by pushing the rod 20 downwardly, cause the pinions 22 to disengage the gear 15 so as to allow the rotary rake 16 to idle.

It has been found that if the rake 16 rotates in the same direction as the rotary blades 10, it will not lift matted or downtrodden grass. In fact, it will simply roll the grass backwardly as the lawn mower moves thereover. However, by rotating the rake in the opposite direction to the blades 10, the rake teeth at the bottom move forwardly at a greater speed than the lawn mower, thus engaging and lifting the grass and combing it forwardly to a position where it will be engaged by the rearwardly moving knives 10.

The rake 16 may have any desired construction. A very satisfactory construction is illustrated, consisting of a cylindrical wooden roller provided with spiral lines of projecting spikes 24.

In Figs. 4 and 5, an alternate method of supporting the rotary rake is illustrated. In this form, the rake 16 is carried in bearings 25 in a U-shaped yoke frame 26. The rake 16 is mounted on a shaft, the extremities of which are provided with small pinion gears 27, which engage the gears of the lawn mower wheel. The yoke 26 is formed with an arm 28 which extends through a slot 29 in the handle of the lawn mower, which can be clamped in the slot in any desired position by means of a wing nut 30.

A spring clamp 31 engages the arm 28 so as to provide a cushion member which will relieve the pinion gears 27 from damage should rocks, sticks or other obstructions become entangled in the gears.

This form of the invention operates similarly to the previously described form, and rakes and straightens the grass in advance of the rotary knives so that a neat, complete, cutting operation is performed.

While the invention has been illustrated as applied to a lawn mower, it is, of course, conceivable that if desired, the rotary blades 10 and the stationary blades 13 could be eliminated, and the device employed simply as a rotary rake or cultivator, allowing the cutting to be done with a separate machine.

While a specific form of the improvement has been described and illustrated herein, it is desired to be understood that the same may be varied, within the scope of the appended claims, without departing from the spirit of the invention.

Having thus described the invention, what is claimed and desired, secured by Letters Patent is:—

1. In a lawn mower having ground-engaging wheels and rotary knife blades driven from said wheels, means for raking the grass forwardly in advance of said blades comprising: external gear teeth formed in each of said wheels; a rotary rake member extending between said wheels ahead of said rotary knives; and pinions on the extremities of said rake member engaging said gear teeth; a shiftable frame member supporting said rake member ahead of said rotary knives; and means for moving said frame member so as to bring said pinions into or out of engagement with said gear teeth.

2. The combination with a lawn mower of the type described, of a yoke member slidably mounted on the handle of said mower; a bearing at each extremity of said yoke; gears in the wheels of said mower; a rotary rake suspended in said bearings and extending between said wheels ahead of said mower; and pinions on the extremities of said rake, engaging said gears.

3. The combination with a lawn mower of the type described, of a yoke member movably suspended from the handle of said mower; gears in the wheels of said mower; a rotary rake mounted in said yoke and extending between the forward portions of said wheels; pinions on the extremities of said rake opposite said gears; and means for shifting said yoke so as to bring said pinions into mesh with said gears when desired.

4. The combination with a lawn mower having ground-engaging wheels, a rotary knife and a propelling handle of a forked yoke member extending forwardly from said handle, each arm of said forked yoke member terminating adjacent one of said wheels; a bearing on the forward extremity of each of said arms; a rake shaft extending between and through said bearings; a rake member mounted on said rake shaft; gear teeth in said wheels; and pinions on the extremities of said rake shaft engaging said gears.

5. The combination with a lawn mower having ground-engaging wheels, a rotary knife, and a propelling handle, of a forked yoke member extending forwardly from said handle, each arm of said forked yoke member terminating adjacent one of said wheels; a bearing on the forward extremity of each of said arms; a rake shaft extending between and through said bearings; a rake member mounted on said rake shaft; gear teeth in said wheels; pinions on said rake shaft engaging said teeth; and means for shifting the position of said yoke member to move said pinions out of engagement with said gear teeth when desired.

6. The combination with a lawn mower having ground-engaging wheels, a rotary knife, internal gear teeth in said wheels for driving said rotary knife, and a propelling handle, of a forked yoke member extending forwardly from said handle; each arm of said forked yoke member terminating adjacent one of said wheels; a bearing on the forward extremity of each of said arms; a rake shaft extending between and through said bearings; a rake member mounted on said rake shaft; external gear teeth in said wheels; and pinions on the extremities of said rake shaft engaging said external gear teeth, so that said rake will rotate in one direction as said knives rotate in the opposite direction.

7. The combination with a lawn mower having ground-engaging wheels, a rotary knife, internal gear teeth in said wheels for driving said rotary knife, and a propelling handle; of a forked yoke member extending from said handle, each arm of said forked yoke member terminating adjacent one of said wheels; a bearing on the forward extremity of each of said arms; a rake shaft extending between and through said bearings; a rake member mounted on said rake shaft; external gear teeth in said wheels; and pinions on the extremities of said rake shaft engaging external gear teeth, so that said rake will rotate in one direction as said knives rotate in the other direction; and means for shifting said yoke member so that said pinions may be moved out of engagement with said gear teeth when desired.

8. The combination with a lawn mower having ground-engaging wheels, a rotary knife and a propelling handle, of a forked yoke member extending forwardly from said handle, each arm of said forked yoke member terminating adjacent one of said wheels; a bearing on the forward extremity of each of said arms; a rake shaft extending between and through said bearings; a rake member mounted on said rake shaft; gear teeth in said wheels; pinions on the extremities of said rake shaft engaging said gear teeth; and spring means for holding said pinions in mesh with said gears.

JEROME J. MILLER.